Aug. 28, 1956 R. H. AIRES 2,761,024
SIGNAL COMBINING CIRCUIT
Filed March 3, 1953
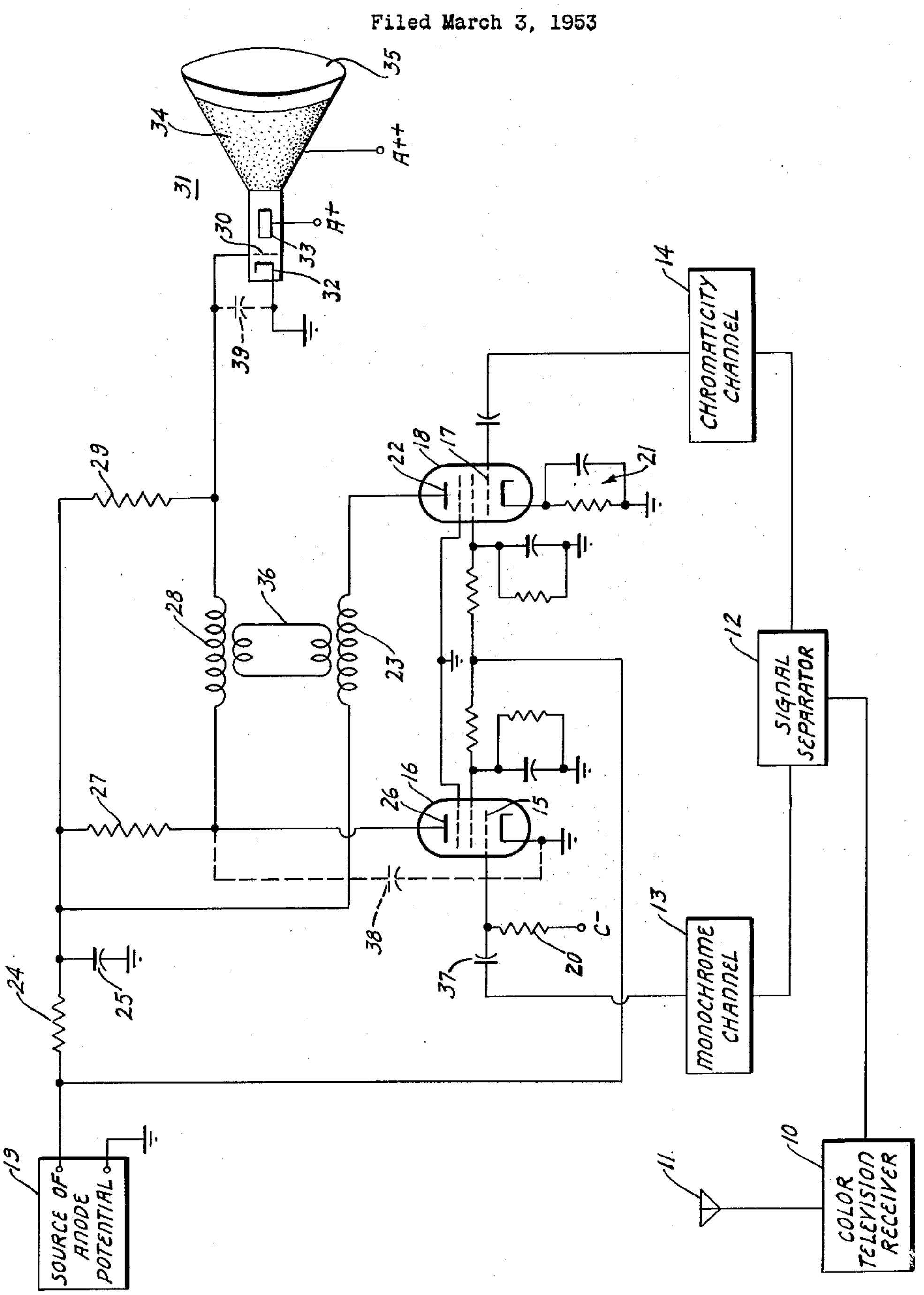
INVENTOR.
RAMON H. AIRES
BY
Allen V. Hazeltine
ATTORNEY United States Patent Office 2,761,024

Patented Aug. 28, 1956

2,761,024

SIGNAL COMBINING CIRCUIT

Ramon H. Aires, Elkins Park, Pa., assignor to Philco Corporation, Philadelphia, Pa., a corporation of Pennsylvania Application March 3, 1953, Serial No. 339,962

10 Claims. (Cl. 179—171)

The present invention relates to improvements in signal combining circuits and more particularly to improvements in circuits for additively combining electrical signals of relatively low frequency with other signals of relatively high frequency.

There is frequent need for circuits which are effective to combine additively separate signals having the aforementioned frequency characteristics. For example, in certain color television systems, there is broadcast a signal which includes two picture components. One of these, the so-called monochrome component, conveys information concerning the brightness of the televised scene and occupies a predetermined low frequency range extending down to and including zero frequency. The other component, called the chromaticity component, conveys information concerning the coloration of the same televised scene and occupies a predetermined high frequency range which extends beyond the upper limit of the monochrome component range. Typical values are zero to three megacycles for the monochrome frequency range and three to four megacycles for the chromaticity range. In processing this broadcast signal at a color television receiver, before utilizing it to control the formation of an image in full color, it is sometimes desired to direct the two components into separate channels, to operate upon them separately and then to recombine them in somewhat modified form so as to reconstitute a single composite signal. An understanding of the reasons why such separation and recombination may be desirable is not essential to the understanding of the present discussion. Briefly, however, the need therefor may arise when it is desired to produce the colored image by utilizing the composite signal to control the electron beam intensity of a cathode ray tube whose screen structure comprises a large number of minute phosphor elements, different ones of which fluoresce in different primary colors, such as red, green and blue, for example. If, in such a system, the composite signal is utilized to control the beam intensity with its monochrome and chromaticity components in their unmodified amplitude relationships, then color desaturation will result because the phosphor elements have finite dimensions while the intervals during which the composite signal is accurately representative of any given primary color are of infinitesimal duration. The degree of desaturation can be drastically reduced by diminishing the amplitude of the monochrome component by an amount proportional to the amplitude of the chromaticity component. Such a modification of relative amplitudes is, of course, carried out most readily when the components are available in separate channels whose gains can be independently controlled. A detailed description of circuits which are suitable for carrying out this modification of relative amplitudes is found in the copending U. S. patent application of Stephen W. Moulton, Serial No. 290,775, filed May 29, 1952 and assigned to the assignee of the present invention. In one of the embodiments shown in this copending patent application, namely that of Figure 3, the operations which are performed on the chromaticity component of the composite signal while it is separate from the monochrome component, also include the stepping up of its frequency. This additional modification is carried out in order to match the rate of occurrence of color representative intervals in the composite signal more closely to the rate at which the electron beam impinges upon successive colored phosphor elements during its traversal of the screen structure. A typical increase in frequency for this purpose is to the 6.5 to 7.5 megacycle range. As a result of the foregoing operations there are presented, at the respective output stages of the separate monochrome and chromaticity channels, a monochrome signal component of relatively low frequency and a chromaticity signal component of relatively high frequency.

Ordinarily, each such output stage comprises a variable impedance device which is supplied with the signal in the channel and which is connected through a load impedance to a source of unidirectional potential. Variations in the impedance of the device, occurring in response to variations in the supplied signal, produce variations in the direct operating current which flows through the variable impedance device and also through its load impedance, and cause reproduction of the supplied signal across the load impedance. To combine the signals which are thus developed across the separate load impedances, it is preferred to connect the latter in series. The sum of the separate signals is then developed across the series combination of these impedances. Series addition is preferable to other modes of addition, such as, for example, addition by connection of load impedances in parallel, because the latter form of connection always introduces signal attenuation and also requires the careful selection of the various impedances to avoid adding the different signals with undesired weighting factors. On the other hand, if the signal is developed by series addition and is supplied to a utilization device which has high impedance, then no signal attenuation occurs and all signals are added with unity weighting factors. In the present instance the grid of the cathode ray tube, to which the combined signals are supplied, has the requisite high impedance.

The variable impedance devices in question are usually vacuum tubes, and the series connected load impedances are then the anode output circuits of these vacuum tubes. Consequently, these impedances serve not only to develop output signals from, but also to supply unidirectional operating potential and direct current to the respective vacuum tube anodes. Unless these load impedances have very high values at the frequencies of the signals developed thereacross, the signals so developed will be of small amplitude and will require still further amplification. In the case of the color television system under consideration, one of the signals to be combined lies in a comparatively low frequency range, which even includes zero frequency, so that the load impedance across which it is developed must have a large resistive component. The other signal to be combined lies in a higher frequency range and can, therefore, be successfully developed across an element having a large inductive component but only a comparatively small resistive component. In prior art circuits in which, as has been indicated, the two load impedances are simply connected in series, there flow through the large resistive load impedance of the low frequency (monochrome) output tube not only the desired output signal currents, but also the steady, unidirectional current which is required to operate the high frequency (chromaticity) output tube. Consequently, a D.-C. potential drop takes place across the low frequency load impedance which is considerably greater than it would be if the low frequency output tube alone were connected to this impedance. The occurrence of this drop compels the use of a source of anode potential of much higher value than is necessary to operate either vacuum tube alone. The power which is dissipated in this same resistive load, because of the large direct current flowing therethrough, is also much greater than it need be, so that the source of anode potential is also required to have large power capacity. Furthermore, since the combined signal developed across the series combination of resistor and inductor is preferably supplied through D.-C. coupling means to the cathode ray tube input electrode so as to preserve the intelligence representative D.-C. component of the monochrome component, only a single-tuned circuit can be used in the prior art circuit in order to enhance the amplitude of the chromaticity components. Single-tuned circuits have inherently non-linear phase characteristics so that the phase of the chromaticity signal, and also the coloration of the reproduced image, are subject to deleterious distortion due to the operation of this combining circuit.

It is, accordingly, a primary object of the invention to provide an improved circuit for the additive combination of different electrical signals.

It is another object of the invention to provide an improved circuit for the combination of an electrical signal of relatively low frequency with an electrical signal of relatively high frequency.

It is still another object of the invention to provide an improved circuit for the additive combination of signals having components in different frequency ranges, one of which includes zero frequency.

It is a further object of the invention to provide an improved circuit for additively combining the signals developed across the load impedances of two separate variable impedance devices which use a common source of unidirectional operating potential.

It is yet another object of the invention to provide a circuit for additively combining the signals appearing at the anodes of two separate vacuum tubes, while using a common source of anode supply potential of minimum value for both tubes.

It is a still further object of the invention to provide a circuit for additively combining a signal having components in a low frequency range including zero frequency with a second signal having frequency components above said low frequency range in such manner as to produce no substantial phase distortion of the High frequency signal components during addition.

A still further object of the invention resides in the provision of a circuit for additively combining signals which are respectively in low frequency and high frequency ranges, the combining circuit being characterized by a substantially linear phase response for signals within the aforesaid high frequency range.

The foregoing objects, as well as others which will appear, are achieved by using a resistor as the load impedance of the variable impedance device which produces the low frequency, or monochrome channel output signal and an inductor as the load impedance of the variable impedance device which produces the high frequency, or chromaticity channel output signal, and by connecting these impedances not in series, as heretofore, but in parallel to a common source of unidirectional operating potential.

When these variable impedance devices are in the form of vacuum tubes, then the aforementioned resistor is the anode load resistor of the monochrome output tube and the aforementioned inductor is the anode load inductor of the chromaticity output tube. To that terminal of the anode resistor which is connected to the monochrome output tube anode, there is then further connected a second inductor which is inductively coupled to the load inductor of the chromaticity output tube. In this arrangement, the combined monochrome and chromaticity signals are developed across the series combination of monochrome load resistor and inductively coupled inductor. On the other hand, the direct operating current for the chromaticity output tube now flows no longer through the load resistor of the monochrome output tube but instead follows a separate path of comparatively low resistance through the load inductor. Consequently, the potential drop due to this direct current flow no longer appears in series with the monochrome output tube anode. Conversely, the potential drop due to direct operating current flowing to the monochrome tube no longer appears in series with the chromaticity output tube anode. As a result, a source of anode potential can be used which provides the minimum potential value compatible with successful parallel operation of the two output tubes. Furthermore, the flow of direct current to the chromaticity tube through the load inductor causes less power loss than did the flow of this current through the load resistor so that the power output requirements for the anode potential source are lowered. Finally, the load inductor, and the second inductor which is inductively coupled thereto, constitute the primary and secondary windings, respectively, of a double tuned circuit which can, by suitable choice of parameters, be given a phase characteristic having any desired degree of linearity within the chromaticity signal frequency range.

The details of construction and operation of the aforedescribed circuit will be better understood from the following discussion taken in conjunction with the accompanying drawing wherein the single figure is a schematic diagram of a signal combining circuit embodying my invention.

In this drawing, to which more particular reference may now be had, there is diagrammatically illustrated a color television receiver 10, adapted to be supplied with signals intercepted by antenna 11 and including all those components of such a receiver which conventionally precede its lowest frequency, or video stages. These conventional components will normally include a radio frequency amplifier, a converter, an intermediate frequency amplifier and a video detector. The received color television signal, reduced to its lowest frequency or video range, is then supplied from receiver 10 to signal separator 12 which may consist of frequency sensitive filters conventionally constructed to separate the monochrome signal components from the chromaticity signal components. The signal separator 12 is equipped with separate output circuits for these separated signal components, one of these output circuits being connected to the input circuit of the monochrome channel 13, while the other output circuit is connected to the input circuit of chromaticity channel 14. Both the monochrome channel 13 and the chromaticity channel 14 will ordinarily be equipped with a number of conventional amplifying stages, as well as with suitable signal modifying means of the kind fully described in the above-identified co-pending application of Stephen W. Moulton. As will be seen from a consideration of the Moulton application, the desired modification of the relative characteristics of the signals in the monochrome and chromaticity channels may also necessitate some interconnection between the two channels. However, since the nature of these interconnections is of no importance to the practice of my invention, they have not been shown in the drawing under consideration. Suffice it to note that, at the respective outputs of the monochrome and chromaticity channels, there will be available signals respectively representative of monochrome and chromaticity intelligence, the monochrome signal occupying a frequency range which extends from zero frequency to an upper limit of about 3 megacycles, while the chromaticity signal occupies some higher frequency range such as, for example, that extending from 6.5 to 7.5 megacycles.

The output circuit of monochrome channel 13 is connected to the control grid 15 of a pentode 16, while the output circuit of chromaticity channel 14 is connected to the control grid electrodes 17 of another pentode 18. Each of these pentodes is additionally provided with the conventional connections to its remaining grid electrodes.

Thus the suppressor grid of each pentode is grounded, while the screen grid electrode of each pentode is connected to a source of anode potential 19 through appropriate voltage dropping resistors and resistance-capacitance networks. For reasons which will appear hereinafter, the cathode of pentode 16 is grounded directly and its control grid electrode 15 is connected to a conventional source of negative grid potential through a resistor 20. The cathode of pentode 18, on the other hand, is grounded through a parallel R-C network in conventional manner to provide a self-bias for its control grid electrode 17. The anode 22 of pentode 18 is connected to the aforementioned source of anode potential 19 through an inductor 23 and an R-C network 24, 25, the R-C network being so disposed that the resistor 24 is in series with the inductor 23, while the capacitor 25 is connected from the junction of resistor 24 and inductor 23 to ground. The anode 26 of pentode 16, on the other hand, is connected to the same R-C network 24, 25 and thence to the source of anode potential 19 by way of two parallel paths, one of which includes a resistor 27, while the other includes the series combination of a second inductor 28 and a second resistor 29. The junction of inductor 28 and resistor 29 is, in turn, connected to the beam intensity control grid 30 of a conventional color cathode ray tube 31, which latter is equipped, in conventional manner, with a cathode 32, a first anode 33 supplied with anode potential from a source of suitable potential A+, a second anode 34 supplied with anode potential from a source of suitable potential A++ and with a screen structure 35 similar to that described in the aforementioned copending Moulton application and illustrated in Figure 5 thereof. While inductors 23 and 28 may be so disposed that magnetic flux produced by one inductor links the turns of the other, it is preferred, for reasons which will appear hereinafter, to isolate these inductors capacitively and inductively from each other and to use a separate coupling inductor, designated by reference numeral 36 in the drawing and having a small number of turns compared to either inductor 23 or inductor 28 to effect inductive coupling therebetween. In practice, the necessary isolation between windings can be readily achieved by simply spacing them far apart.

In operation, the high frequency signals from chromaticity channel 14 are amplified in vacuum tube 18 in conventional manner and are developed in amplified form across anode load inductor 23 of this vacuum tube. Thence they are supplied, by way of coupling inductor 36, to an inductor 28 which acts as the secondary winding of a double tuned circuit. The resistors 27 and 29, which are connected in series across this inductor 28, act as the damping resistors for the secondary winding and, by appropriate choice of their values, can be made to impart a comparatively broad frequency response characteristic and a correspondingly linear phase response characteristic to this double tuned circuit. It will be seen that anode potential and direct operating current are supplied to tube 18 from source 19 through a path which includes neither resistor 27 nor resistor 29. Instead, this path includes only the series combination of resistor 24 and inductor 23. Of these elements, the inductor has inherently very low D.-C. resistance, while the resistor 24 is preferably chosen with low D.-C. resistance, since it is provided only for the purpose of cooperating with capacitor 25 to form a decoupling network which inhibits the feedback of high frequency signals from vacuum tube 18 to the source of anode potential 19. By reason of these connections, no appreciable D.-C. potential drop occurs between the source of anode potential 19 and the anode 22 of tube 18, so that the potential developed by source 19 need be no greater than that which is desired for application directly to this anode 22. In addition no appreciable power loss is caused by the flow of direct current to anode 22.

Considering now the signals from monochrome channel 13, it will be recalled that they are supplied to vacuum tube 16, as hereinbefore explained. By reason of series capacitive connections which are normally found within the monochrome channel as well as at its output, and which are symbolized in the drawing by capacitor 37 connected between the monochrome channel 13 and the grid control electrode 15 of tube 16, the monochrome signal will have lost its D.-C. component by the time it reaches vacuum tube 16. Since this D.-C. component conveys important picture intelligence, it is necessary to restore it before applying the signal to the picture tube. A convenient manner of effecting this restoration involves the use of the control grid electrode 15 of vacuum tube 16 not only for controlling the flow of space current through the vacuum tube in accordance with the applied signal but also for detecting the amplitude of this signal. The fact that the cathode of tube 16 is directly grounded, instead of being provided with the usual resistor by-passed for alternating current, enables it to cooperate with the grid 15 in a manner analogous to the cooperation between the cathode and anode of a diode so that a D.-C. grid bias is developed across resistor 20 which corresponds to the peak amplitude, or black reference level of the monochrome signal. This bias in turn controls the anode potential so that the latter is also proportional to this amplitude. Thus the D.-C. component of the monochrome component is restored at the anode 26 of tube 16. Since inductor 28 has very low impedance at D.-C. and at the other low frequencies of the monochrome signal, its presence in the output circuit of vacuum tube 16 can be disregarded for practical purposes so that the load impedance of vacuum tube 16 consists effectively of the parallel combination of resistors 27 and 29. The values of these resistors are preferably so chosen that their parallel combination has the same value as that of a single output resistor appropriate for use as the load resistor of vacuum tube 16. Again it should be noted that only the anode 26 of vacuum tube 16 is connected to the source of anode potential 19 through resistors 27 and 29 so that only that unidirectional current which is necessary to operate tube 16 will flow through these resistors. Consequently, the voltage drop across these resistors, and also the power dissipated therein, will be at a minimum and a decrease in the voltage and power requirements imposed on the source of anode potential 19 becomes possible.

It has already been observed that resistors 27 and 29 serve not only as the anode load resistors for vacuum tube 16 but also as the damping resistors for the secondary winding 28 of the double tuned output circuit of vacuum tube 18. It has been found that these two uses are entirely compatible, for it is possible to select the values of these resistors in such a manner that they can perform both functions at once. However, by reason of their particular arrangement in the circuit, resistors 27 and 29 serve still another purpose. As is well known, the electrodes of vacuum tubes are ordinarily of such construction that there exists appreciable capacitance between them. In particular, it is well known that a pentode such as tube 16, for example, has appreciable capacitance between its anode and cathode. In its operation, my circuit takes advantage of the existence of this capacitance and also of the existence of a similar capacitance between the beam intensity control grid electrode 30 and the cathode 32 of cathode ray tube 31. To emphasize that these two capacitances have no existence independently of the vacuum tubes with which they are associated, they are represented in broken lines at 38 and 39 in the drawing. Together with the series combination of resistors 27 and 29, these capacitances form a low-pass filter transmissive of monochrome signal components which can, by appropriate choice of parameters, be given that characteristic which is most advantageous from the point of view of supplying the various frequency components of the monochrome signal to the cathode ray tube with appropriate relative amplitudes. If the inter-electrode capacitances 38 and 39 are not of the proper magnitude to cooperate with resistors 27 and 29 to form a low-pass filter having the desired frequency response for the monochrome signal, then appropriate additional capacitors may, of course, be provided to achieve the desired values of capacitance.

From the foregoing it will be seen that the circuit arrangement embodying my invention not only reduces the voltage and power requirements of the source of anode potential but also provides a low-pass filter with desired frequency response characteristics for the application of the monochrome signal to the cathode ray tube and a band-pass filter having broad band, i. e. linear phase characteristics for the application of the chromaticity signal to the cathode ray tube.

The capacitance which would exist between inductor 23 and inductor 28, if the latter were in such close spatial proximity that inductive coupling between them could occur, would be so large as to attenuate undesirably the higher frequency components of the monochrome signal. It is particularly to avoid this that the two inductors are preferably capacitively and inductively isolated from each other, as has already been mentioned, while signal transfer between them is effected by the coupling inductor 36.

Typical values of the components constituting the output circuits of the two vacuum tubes 16 and 18 which have been used in a successful embodiment of the invention are as follows:

Inductor 23, variable from 22 to 70 microhenrys,
Inductor 28, variable from 65 to 200 microhenrys,
Coupling inductor 36:
 7 turns of wire coupled to inductor 23,
 6 turns of wire coupled to inductor 28,
Resistors 27 and 29, 6800 ohms each,
Resistor 24, 390 ohms,
Capacitor 25, 10 microfarads,
Interelectrode capacitance 38, 5.5 micromicrofarads,
Interelectrode capacitance 39, approximately 15 micromicrofarads.

It will be apparent to those skilled in the art that modifications in the foregoing circuit arrangement may be made without departing from the concept of my invention. In particular it will be understood that the invention is not limited in its application to circuits involving vacuum tubes. Rather, it is applicable to all circuits which utilize variable impedance devices which respond to applied signals to produce signal variations across their load impedances. Transistors are devices having such variable impedance characteristics and all the advantages of my invention will indeed be realized if the load impedances of two transistors are connected in a circuit similar to that which is shown herein for use with vacuum tubes.

Accordingly, I desire the scope of my invention to be defined only by the appended claims.

I claim:

1. In a circuit for combining relatively low and relatively high frequency signals: first and second devices whose impedances are variable in response to supplied signals, a common source of unidirectional operating potential for said devices, a first load impedance including a resistive component connected to provide a first path for the flow of direct current between said first variable impedance device and said source of unidirectional potential, a second load impedance including a first inductor connected to provide a second path separate from said first path for the flow of direct current between said second variable impedance device and said source of unidirectional potential, a second inductor inductively coupled to said first inductor and having one terminal connected to said first load impedance at a point intermediate said first load impedance and said first device, and means for connecting the other terminal of said second inductor to a signal utilization device.

2. In a circuit for combining relatively low and relatively high frequency signals: first and second devices whose impedances are variable in response to supplied signals, a common source of unidirectional operating potential for said devices, a first direct current transmissive element of relatively high resistance connecting said first variable impedance device to said source of unidirectional potential, a second direct current transmissive element of relatively low resistance but of relatively high inductance connecting said second variable impedance device separately to said source of unidirectional potential, an inductor inductively coupled to said element of high inductance and connected to said first element at a point intermediate said element and said first variable impedance device, and means for connecting the other terminal of said inductor to a signal utilization device.

3. In a circuit for combining relatively low and relatively high frequency signals: first and second devices whose impedances are variable in response to supplied signals, a common source of unidirectional operating potential for said devices, a first load impedance including a resistive component connected to provide a first path for the flow of direct current between said first device and said source of unidirectional potential, a second load impedance including a first inductor connected to provide a second path separate from said first path for the flow of direct current between said second device and said source of unidirectional potential, a second inductor inductively coupled to said first inductor and having one terminal connected to said first load impedance at a point intermediate said first load impedance and said first device, and means for deriving signals of both said low and high frequencies from the series combination of said resistive component and of said second inductor.

4. In a circuit for combining relatively low and relatively high frequency signals: first and second vacuum tubes, a common source of anode potential for said vacuum tubes, a first load impedance including a resistive component connected to provide a first path for the flow of direct current between the anode of said first tube and said source of anode potential, a second load impedance including a first inductor connected to provide a second path separate from said first path for the flow of direct current between the anode of said second tube and said source of anode potential, a second inductor inductively coupled ot said first inductor and having one terminal connected to said first load impedance at a point intermediate said first load impedance and said anode of said first tube, and means for connecting the other terminal of said second inductor to a signal utilization device.

5. Apparatus according to claim 4 further characterized in that said inductive coupling between said first and second inductors is effected by means of a separate coupling inductor having few turns compared to the number of turns in each of said first and second inductors, said last-named inductors proper being capacitively and inductively isolated from each other.

6. Apparatus according to claim 4 further characterized in that said other terminal of said second inductor is also connected to said first load impedance at a point intermediate said first load impedance and said source of anode potential.

7. Apparatus according to claim 6 further characterized in that said connection between said other terminal of said second inductor and said first load impedance includes a series resistive component of substantially the same value as the said resistive component of said first load impedance.

8. A drive circuit for the beam intensity control grid electrode of a cathode ray tube, said drive circuit comprising: first and second pentode vacuum tubes for producing first and second signals in relatively low and relatively high frequency ranges at their respective anodes, a common source of unidirectional anode potential for said vacuum tubes, a first resistor connected between the anode of said first pentode vacuum tube and said source of anode potential, a first inductor connected between the anode of said second pentode vacuum tube and said source of anode potential, a second inductor inductively coupled to said first inductor, said second inductor having one terminal connected to a point intermediate said first resistor and said anode of said first pentode and having the other terminal connected through a second resistor to a point intermediate said first resistor and said source of anode potential, said cathode ray tube having interelectrode capacitance between its said control grid electrode and its cathode and said first pentode vacuum tube having interelectrode capacitance between its anode and its cathode, said interelectrode capacitances cooperating with said first and second resistors to form a low-pass filter transmissive of signals in said relatively low frequency range and said first and second inductors cooperating with said first and second resistors to form a double tuned circuit with damped secondary which is transmissive of signals in said relatively high frequency range.

9. Apparatus according to claim 8 and further comprising a low-pass filter connected intermediate said source of anode potential and said first resistor and first inductor, said low-pass filter being substantially non-transmissive of signals in said relatively high frequency range.

10. Apparatus according to claim 8 and further characterized in that said first and second resistors have values such that their parallel combination has the same effective resistivity as a single anode load resistor suitable for use with said first pentode vacuum tube.

No references cited.